United States Patent [19]

Herbst

[11] Patent Number: 4,811,543
[45] Date of Patent: Mar. 14, 1989

[54] PROCESS FOR INSTALLING PLASTIC PIPES IN A PLASTER FLOOR LAYER

[76] Inventor: Donald Herbst, Marienplatz 11, 1000 Berlin 45, Fed. Rep. of Germany

[21] Appl. No.: 839,211

[22] Filed: Mar. 11, 1986

[30] Foreign Application Priority Data

Mar. 12, 1985 [DE] Fed. Rep. of Germany ....... 3509264

[51] Int. Cl.$^4$ .............................................. E04G 21/00
[52] U.S. Cl. ........................................ 52/741; 52/220; 237/69
[58] Field of Search ............... 52/741, 743, 220; 237/69; 165/49, 53; 264/31, 34, 35

[56] References Cited

U.S. PATENT DOCUMENTS

| | | | |
|---|---|---|---|
| 400,308 | 3/1889 | Cranmer | 264/35 |
| 1,740,336 | 12/1929 | Crittal | 52/220 |
| 1,910,594 | 5/1933 | Dela Mare | 264/34 |
| 2,052,359 | 8/1936 | Musgrave | 165/49 |
| 2,621,027 | 12/1952 | Tatsch | 237/69 |
| 3,568,924 | 3/1971 | Chenault | 237/69 |

*Primary Examiner*—John E. Murtagh
*Attorney, Agent, or Firm*—Basile and Hanlon

[57] ABSTRACT

A process is described for the installation of a floor heating system through which a heating medium flows and which comprises a plurality of plastic pipes (7) forming mats. The plastic pipes are embedded in a predetermined height in a plaster layer (9). The mats are initially placed on a substrate, preferably a thermal insulating layer and connected to the heating system. A given pressure is then produced in the plaster pipes. A first plastic layer is then applied to the mats and has a consistency such that the plastic pipes float on the plaster layer after a certain time and partly project therefrom. After the first plaster layer has set to such an extent that the plastic pipes are fixed in position, a second plaster layer with a thickness of approximately 10 to 15 mm is applied to the first plaster layer. The plastic pipes are fixed in position by the first plaster layer, so that they cannot float in the second plaster layer. As the first plaster layer has still not completely set at the time of applying the second plaster layer, between the two layers a homogeneous connection is formed, so that a through plaster layer is obtained in which the plastic pipes are embedded at a predetermined height.

11 Claims, 1 Drawing Sheet

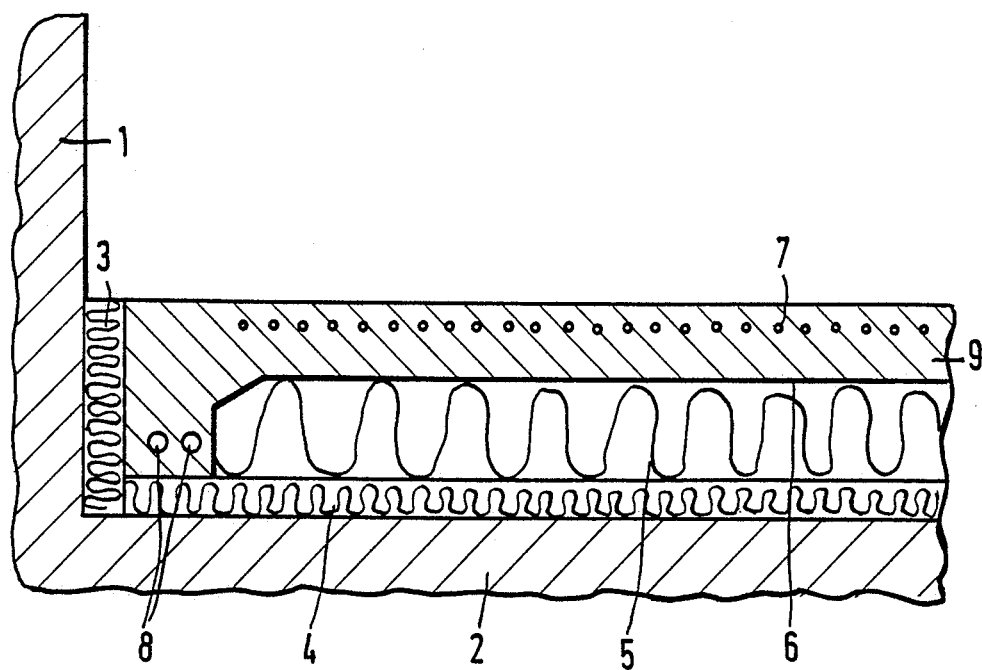

PROCESS FOR INSTALLING PLASTIC PIPES IN A PLASTER FLOOR LAYER

The present invention relates to a process for the installation of plastic pipes through which a medium flows in a plaster layer completely surrounding the pipes, in which the pipes are laid on a substrate and a given pressure produced therein and subsequently the plaster is applied to the pipes.

BACKGROUND OF THE INVENTION

For the purpose of heating a floor it is known to manually lay a flexible plastic pipe in the floor plaster, whereby one end of the pipe is connected to the outgoing part and its other end is connected to the return part of a hot water line or pipe. The laying of such a plastic pipe must be carried out with particular care, in order to obtain a satisfactory heating of the floor. However, it is not possible to reliably obtain an absolutely uniform heating of the floor, because the flexible plastic hose can be displaced during manual laying. In addition, the hose must have a diameter of at least 10 mm to permit its laying by hand. Laying the hose also takes time. In addition, the efficiency of this floor heating is unsatisfactory, because the temperature of the outgoing part of the hot water must be much higher than the sought ambient temperature.

DE-OS No. 31 24 048 discloses a heater for a hot water surface heating system, particularly for floor or wall heating purposes, in which the hot water is passed through at least one plastic pipe laid in one plane in the floor or wall part to be heated and connected to the outgoing and return parts. The heater comprises a plurality of reciprocally spaced, small diameter, flexible plastic pipes combined to form a mat and which are combined at least at one end to form connections for the connecting pieces forming the outgoing and return parts for the hot water receiving the pipe ends in parallel arrangement and accompanied by reciprocal sealing. The mat is reinforced by retaining members fixing the pipe spacings and arranged on the circumference thereof and at right angles to the pipes and in this way form a flexible network-type unit which can be freely laid in the plaster of a floor or embedded in the plaster of a wall. Laying in the floor plaster takes place in such a way that the mat formed from the plastic pipes is placed on a substrate and connected to the heating system, so that an adequate pressure can be produced in the plastic pipes. Subsequently the mat is fixed to the substrate and then the plaster is applied. In this process, the plastic pipes are consequently connected to the underside of the set or hardened plaster, because the fixing of the mat to the substrate prevents an uncontrolled mat floating in the still not set plaster. Such an uncontrolled floating could lead to there being no adequate covering by the plaster of the plastic pipes.

In another known process relatively large diameter individual plastic pipes are laid on the substrate and anchored in the insulation before the plaster is applied thereto. Thus, the plastic pipes are located below the hardened plaster layer, which has a thickness of approximately 30 mm. The thus produced floor heating system requires relatively high temperatures of the heating medium conveyed through the plastic pipes and also leads to a non-uniform heat distribution in the floor. In addition, there is only a limited controlability of heating.

SUMMARY OF THE INVENTION

The object of the present invention is therefore to provide a process for the installation of plastic pipes through which a medium flows in a plaster layer completely surrounding the pipes, in which the latter are laid on a substrate and a given pressure is produced therein and subsequently the plaster is applied to the pipes, whereby a rapid temperature controlability of the system exists and there is an adequate covering of the plastic pipes by the plaster.

The invention is characterized in that initially a first plaster layer is applied to the pipes having a consistency such that the pipes float on the first plaster layer and that following a predetermined hardening of the first plaster layer and consequently fixing of the pipes, a second plaster layer is applied to the first plaster layer, so that the two plaster layers form a homogenous connection with one another. Preferably the first plaster layer is applied in a thickness of approximately 20 mm and the second plaster layer in a thickness of approximately 10 to 15 mm. The distributing pipes or manifolds connected with the plastic pipes embedded in the plaster are advantageously embedded in the thermal insulation of the floor or, when using a cavity floor, in the cavities below the plaster layers. The medium flowing through the pipes can e.g. be used for heating or cooling the floor.

DESCRIPTION OF THE PREFERRED EMBODIMENT

The invention is described in greater detail hereinafter relative to an embodiment shown in the drawing, which represents a cross-section through part of a floor provided with a floor heating system. In the drawing 1 is a wall and 2 the basic floor of a room to be heated. Parallel to the lower edge of the wall 1 is provided an edge strip 3 cut off level with the upper edge of the finished floor. Above the basic floor 2 is provided a footfall sound attenuating layer 4, which has a thickness of approximately 15 mm. Above this is provided a thermal insulating layer 5 in a thickness of approximately 30 mm, which is having turn covered with a plastic sheet 6.

During the production of the floor provided with the heating system, the plastic pipes 7 are first applied to the plastic sheet 6. The pipes 7 are combined to form mats through which subsequently the heating medium is passed. The plastic pipes are parallel to one another and are held together in the mats by means of straps. A gap is provided between the edge strip 3 and the thermal insulating layer 5. The distributing pipes 8 for the floor heating system are inserted in the gap. After placing the pipes 7 on plastic sheet 6, the approximately 2 mm diameter plastic pipes 7 are connected to the distributing pipe 8. Above the latter within plastic pipes 7 is produced a given pressure, e.g. by means of water, so that they are able in a dimensionally stable manner to withstand these external pressures up to a certain level. This simultaneously establishes whether the floor heating system has the necessary tightness.

A first plaster layer with a thickness of approximately 20 mm is now applied to the mats of the pressurized plastic pipes 7. The consistency of the plaster of this layer is such that the plastic pipes 7 float therein and e.g. project therefrom by up to one millimeter. The first plaster layer then sets to such an extent that the plastic pipes 7 are fixed in the position shown in the drawing, where the pipes are approximately level with the upper surface of the first plaster layer. The latter is allowed to set for approximately 8 to 12 hours, so that it can be walked on and then a second plaster layer in a thickness of approximately 10 to 15 mm is applied thereto and to the plastic pipes 7 which partly project therefrom. Plastic pipes 7 can no longer float therein, because they are fixed in position by the first plaster layer. On applying the second plaster layer, the first plaster layer still has not completely set, so that the two layers form a homogeneous connection with one another. This leads to a through homogeneous plaster layer 9 with a thickness of approximately 30 to 35 mm, in which the plastic pipes 7 are embedded to a desired height. This height is determined in such a way that a reliable covering of the plastic pipes 7 with the plaster is ensured, while there is also good controlability of the floor heating system by rapid heat transfer from plastic pipes 7 to the surface of plaster layer 9. Thus, the present floor heating system only requires relatively low temperatures of the heating medium flowing through the plastic pipes 7.

Following complete hardening, generally a carpet is laid on the plaster layer 9.

Through the use of correspondingly shaped shuttering or form elements, the plaster can also be applied in such a way that cavities form on its underside and can be used for receiving electrical lines and the like. In the case of such cavity floors, the distributing pipes 8 can also be passed through the cavities. The plastic pipes 7 are otherwise placed in the plaster layer in the same way as in the described embodiment, ie. the plaster layer is applied in two stages.

I claim:

1. A process for installation of plastic pipes through which a medium flows in a plaster layer completely surrounding the pipes, comprising the steps of:
    laying the pipes on a substrate;
    producing a given pressure in the pipes, enabling the pipes, in a dimensionally stable manner, to withstand external pressures up to a certain level; and
    subsequently applying plaster to the pipes, said applying step including the steps of:
    initially applying a first plaster layer to the pipes with a consistency such that the pipes float on the first plaster layer and partly project therefrom;
    allowing a predetermined setting and therefore fixing the pipes in the first plaster layer; and
    subsequently applying a second plaster layer to the first plaster layer so that the first and second plaster layers form a homogenous connection with one another.

2. Process as defined in claim 1, wherein said step of laying the pipes includes using such pipes which are suitable for floor heating purposes.

3. Process as defined in claim 1, wherein said step of initially applying the first plaster layer includes applying the first plaster layer with a thickness of substantially 20 mm.

4. Process as defined in claim 1, wherein said step of subsequently applying the second plaster layer includes applying the second plaster layer with a thickness of substantially between 10 and 15 mm.

5. Process as defined in claim 1, wherein said step of laying the pipes includes using the pipes for a floor heating system and embedding the pipes in a thermal insulating of a floor.

6. Process as defined in claim 1, wherein said step of subsequently applying the second plaster layer includes applying the second plaster layer to the first plaster layer substantially 8 to 12 hours following the initial application of the first plaster layer.

7. Process as defined in claim 1, wherein said step of laying the pipes includes laying the pipes on the substrate in form of mats of the pipes.

8. Process as defined in claim 1, wherein said step of laying the pipes includes laying the pipes with a diameter of substantially 2 mm.

9. Process as defined in claim 7, wherein said step of laying in form of mats includes holding the pipes together in each of the mats in a parallel position relative to one another.

10. Process as defined in claim 9, wherein said step of holding the pipes together includes holding the pipes by straps.

11. A process for the installation of plastic pipes through which a medium flows in a plaster layer completely surrounding the pipes, comprising the steps of:
    laying the pipes on a substrate including a thermal insulating layer covered by a plastic sheet;
    producing a given pressure in the pipes; and
    subsequently applying plaster to the pipes, said applying including initially applying a first plaster layer to the pipes with a consistency such that the pipes float on the first plaster layer,
    allowing a predetermined setting and therefore fixing the pipes in the first plaster layer, and
    subsequently applying a second plaster layer to the first plaster layer so that the first and second plaster layers form a homogenous connection with one another.

* * * * *